(12) United States Patent
Roisman

(10) Patent No.: US 11,803,359 B2
(45) Date of Patent: Oct. 31, 2023

(54) DEFINING HIGH-LEVEL PROGRAMMING LANGUAGES BASED ON KNOWLEDGE GRAPHS

(71) Applicant: SAP SE, Walldorf (DE)

(72) Inventor: Pablo Roisman, Sunnyvale, CA (US)

(73) Assignee: SAP SE, Walldorf (DE)

( * ) Notice: Subject to any disclaimer, the term of this patent is extended or adjusted under 35 U.S.C. 154(b) by 28 days.

(21) Appl. No.: 17/210,354

(22) Filed: Mar. 23, 2021

(65) Prior Publication Data
US 2022/0308844 A1    Sep. 29, 2022

(51) Int. Cl.
*G06F 8/40* (2018.01)
*G06F 8/41* (2018.01)

(52) U.S. Cl.
CPC .................. *G06F 8/427* (2013.01)

(58) Field of Classification Search
CPC ........... G06F 8/427; G06F 8/37; G06F 40/221
See application file for complete search history.

(56) References Cited

U.S. PATENT DOCUMENTS

| | | | | |
|---|---|---|---|---|
| 6,990,442 B1* | 1/2006 | Davis | .................... | G06F 40/211 704/9 |
| 11,283,839 B2* | 3/2022 | Raphael | ................ | H04L 41/145 |
| 2014/0280307 A1* | 9/2014 | Gupta | ................. | G06F 16/3331 707/769 |
| 2019/0005163 A1* | 1/2019 | Farrell | ................ | G06F 16/9024 |
| 2019/0303141 A1* | 10/2019 | Li | ........................ | G06F 16/9024 |

OTHER PUBLICATIONS

P. Bednár, "Unified parsing and information extraction language," 2016 IEEE 14th International Symposium on Applied Machine Intelligence and Informatics (SAMI), Herlany, Slovakia, 2016, pp. 131-135, doi: 10.1109/SAMI.2016.7422995. (Year: 2016).*

* cited by examiner

*Primary Examiner* — Hanh Thi-Minh Bui
(74) *Attorney, Agent, or Firm* — Fountainhead Law Group P.C.

(57) ABSTRACT

Some embodiments provide a non-transitory machine-readable medium that stores a program. The program parses a knowledge graph comprising a plurality of nodes and a plurality of edges to identify metadata associated with the plurality of nodes and the plurality of edges. Each edge in the plurality of edges connects a pair of nodes in the plurality of nodes. Each node in the plurality of nodes represents an entity. Each edge in the plurality of edges connecting a particular pair of nodes in the plurality of nodes represents a relationship between two entities represented by the particular pair of nodes. The program further determines a set of token definitions. The program also generates a set of syntax rules based on the identified metadata and the set of token definitions.

20 Claims, 11 Drawing Sheets

700

705 — Template <relationship> <property of related entity><comparison><value>

710 — Template <property> <comparison><value>

715 — Template <action><to all> <entity>

720 — Template <action><to><entity><where><comparison><value>

805 — SHOW PASSENGERS WHERE conditionalExpression ((AND|OR) conditionalExpression)?;

810 — OFFER_UPGRADE TO PASSENGERS WHERE conditionalExpression ((AND|OR) conditionalExpression)?;

815 — OFFER_UPGRADE TO ALL PASSENGERS;

FIG. 8

DEFINING HIGH-LEVEL PROGRAMMING LANGUAGES BASED ON KNOWLEDGE GRAPHS

BACKGROUND

Computer programming involves designing and building a program that instructs a computer to perform a collection of instructions. Programming languages require users learn their specific programming language in order to write programs. Most programming languages are not intuitive, especially for non-technical users and/or users without a computer science background. Often these non-technical users need to access data on computing systems, which would require them writing a program or knowing a programming language in order to interact with the computing systems.

SUMMARY

In some embodiments, a non-transitory machine-readable medium stores a program executable by at least one processing unit of a device. The program parses a knowledge graph comprising a plurality of nodes and a plurality of edges to identify metadata associated with the plurality of nodes and the plurality of edges. Each edge in the plurality of edges connects a pair of nodes in the plurality of nodes. Each node in the plurality of nodes represents an entity. Each edge in the plurality of edges connecting a particular pair of nodes in the plurality of nodes represents a relationship between two entities represented by the particular pair of nodes. The program further determines a set of token definitions. The program also generates a set of syntax rules based on the identified metadata and the set of token definitions.

In some embodiments, parsing the knowledge graph may include extracting each entity from the plurality of entities represented by the plurality of nodes in the knowledge graph; and, for each entity in a subset of the plurality of entities, determining a set of attributes associated with the entity. The identified metadata may include the plurality of entities. The identified metadata may include the set of attributes associated with the entity.

In some embodiments, parsing the knowledge graph may include extracting each entity from the plurality of entities represented by the plurality of nodes in the knowledge graph; and, for each entity in a subset of the plurality of entities, determining a set of relationships with a set of other entities. The identified metadata may include the plurality of entities. The identified metadata may include the set of relationships.

In some embodiments, parsing the knowledge graph may include extracting each entity from the plurality of entities represented by the plurality of nodes in the knowledge graph; and, for each entity in a subset of the plurality of entities, determining a set of actions associated with the entity. The identified metadata may include the plurality of entities. The identified metadata may include the set of actions associated with the entity.

In some embodiments, the program may further receive as input a stream of characters; based on the set of token definitions, generate a sequence of tokens from the stream of characters; parse the sequence of tokens to generate a data structure representing a structure of the stream of characters; and compile the data structure to convert the data structure into a set of programming instructions in a programming language. Generating the set of syntax rules may include, for each entity in the plurality of entities, creating a token representing the entity; for each property associated with the entity, creating a token representing the property; for each action associated with the entity, creating a token representing the action; and, for each relationship associated with the entity, creating a token representing the relationship. Generating the set of syntax rules may be further based on the created tokens and a predefined set of syntax rule templates.

In some embodiments, a method parses a knowledge graph comprising a plurality of nodes and a plurality of edges to identify metadata associated with the plurality of nodes and the plurality of edges. Each edge in the plurality of edges connects a pair of nodes in the plurality of nodes. Each node in the plurality of nodes represents an entity. Each edge in the plurality of edges connecting a particular pair of nodes in the plurality of nodes represents a relationship between two entities represented by the particular pair of nodes. The method further determines a set of token definitions. The method also generates a set of syntax rules based on the identified metadata and the set of token definitions.

In some embodiments, the method may further include receiving as input a stream of characters; based on the set of token definitions, generating a sequence of tokens from the stream of characters; parsing the sequence of tokens to generate a data structure representing a structure of the stream of characters; and compiling the data structure to convert the data structure into a set of programming instructions in a programming language. Generating the set of syntax rules may include, for each entity in the plurality of entities, creating a token representing the entity; for each property associated with the entity, creating a token representing the property; for each action associated with the entity, creating a token representing the action; and, for each relationship associated with the entity, creating a token representing the relationship. Generating the set of syntax rules may be further based on the created tokens and a predefined set of syntax rule templates.

In some embodiments, a system includes a set of processing units and a non-transitory machine-readable medium that stores instructions. The instructions cause at least one processing unit to parse a knowledge graph comprising a plurality of nodes and a plurality of edges to identify metadata associated with the plurality of nodes and the plurality of edges. Each edge in the plurality of edges connects a pair of nodes in the plurality of nodes. Each node in the plurality of nodes represents an entity. Each edge in the plurality of edges connecting a particular pair of nodes in the plurality of nodes represents a relationship between two entities represented by the particular pair of nodes. The instructions further cause the at least one processing unit to determine a set of token definitions. The instructions also cause the at least one processing unit to generate a set of syntax rules based on the identified metadata and the set of token definitions.

In some embodiments, the instructions may further cause the at least one processing unit to receive as input a stream of characters; based on the set of token definitions, generate a sequence of tokens from the stream of characters; parse the sequence of tokens to generate a data structure representing a structure of the stream of characters; and compile the data structure to convert the data structure into a set of programming instructions in a programming language. Generating the set of syntax rules may include, for each entity in the plurality of entities, creating a token representing the entity; for each property associated with the entity, creating a token representing the property; for each action associated with the entity, creating a token representing the action; and, for each relationship associated with the entity, creating a token representing the relationship.

The following detailed description and accompanying drawings provide a better understanding of the nature and advantages of various embodiments of the present disclosure.

BRIEF DESCRIPTION OF THE DRAWINGS

FIG. 7 illustrates example syntax rule templates according to some embodiments.

FIG. 8 illustrates example syntax rules according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for defining high-level programming languages based on knowledge graphs. In some embodiments, a computing system can define such a programming language by receiving a knowledge graph of an ontology of data. In some embodiments, an ontology is a set of concepts or categories within a particular subject matter or domain that shows properties of entities as well as their relationships to one another. Based on metadata associated with the knowledge graph and a set of token definitions, the computing system generates a set of syntax rules. A user can now access the ontology of data using a high-level programming language defined based on the set of syntax rules. For instance, the computing system may receive from a user input in the form of the high-level program language. Based on the token definitions, the computing system converts the input into a sequence of tokens. Next, the computing system uses the set of syntax rules to parse the sequence of tokens and generate a data structure that provides a structural representation of the input. The computing system then compiles the data structure and converts it into any number of different native, low-level programming languages.

Figure 1:
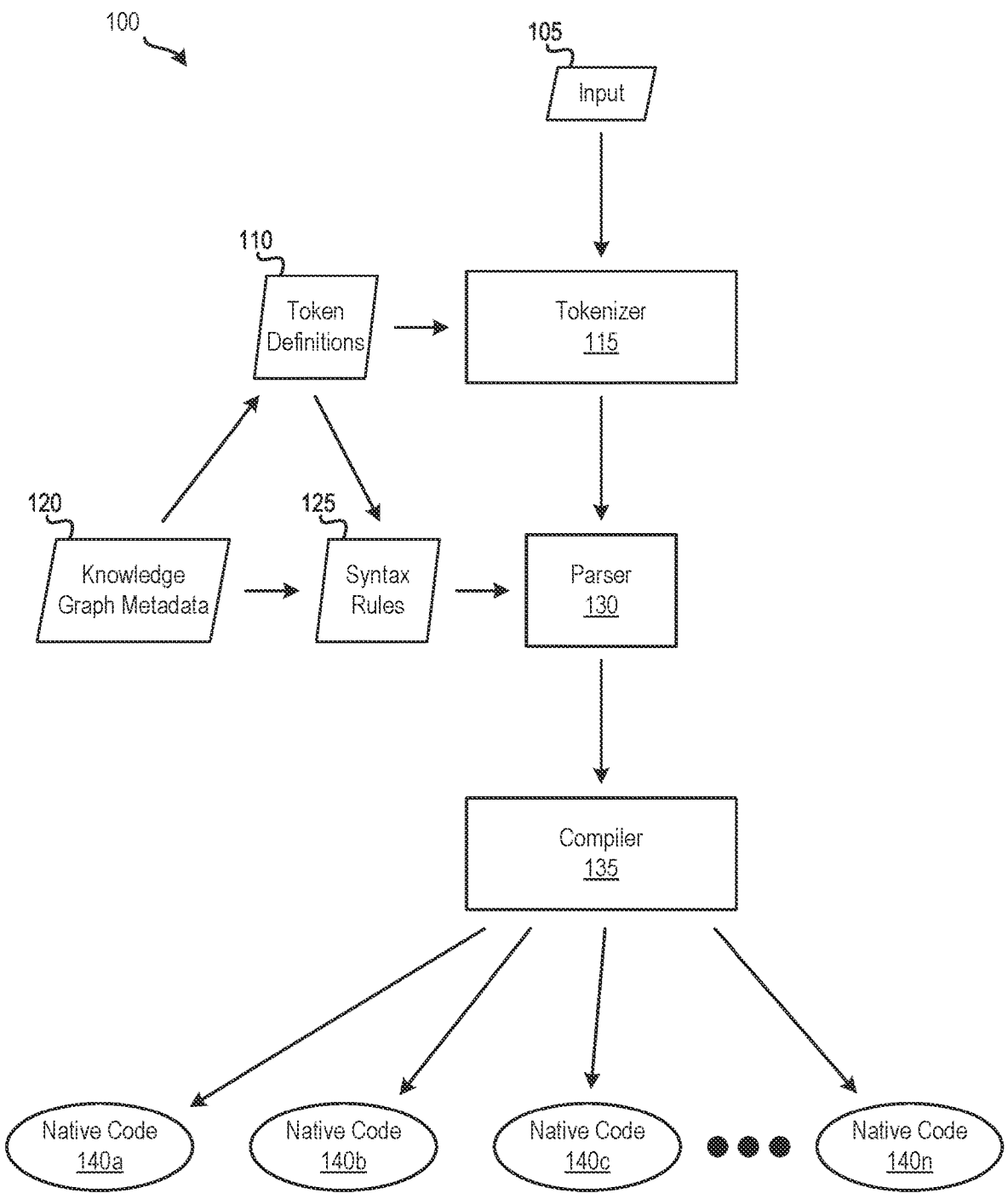
FIG. 1 illustrates a system that processes high-level programming languages defined based on knowledge graphs according to some embodiments.

FIG. 1 illustrates a system that processes high-level programming languages defined based on knowledge graphs according to some embodiments. As shown, system 100 includes tokenizer 115, parser 130, and compiler 135. In some embodiments, tokenizer 115, parser 130, and compiler 135 are implemented on a single computing system while, in other embodiments, tokenizer 115, parser 130, and compiler 135 are implemented on several computing systems.

Tokenizer 115 is configured to convert a stream of characters into a sequence of tokens. As illustrated in FIG. 1, tokenizer 115 receives input 105, which is a stream of characters in this example. In some embodiments, a user provides (e.g., via a client device or a computing system on which tokenizer 115 is operating) input 105 to tokenizer 115. Upon receiving input 105, tokenizer 115 uses token definitions 110 to convert the stream of characters into a sequence of tokens. In some embodiments, a token definition specifies a reserve word and/or a token pattern that are used to define a token. In this example, token definitions 110 are defined based on knowledge graph metadata 120. Knowledge graph metadata 120 may include data about a knowledge graph of an ontology of data such as, for example, the entities represented by nodes of the knowledge graph, the relationships represented by edges connecting the nodes of the knowledge graph, properties of entities, actions associated with entities, etc. Next, tokenizer 115 sends the sequence of tokens to parser 130.

Parser 130 is responsible for processing sequences of tokens. For example, upon receiving a sequence of tokens from tokenizer 115, parser 130 parses the sequence of tokens, performs syntax validation and error handling, and generates a data structure that represents the structure of input 105. In some embodiments, the data structure can be an abstract syntax tree (AST) data structure. As shown in FIG. 1, parser 130 uses syntax rules 125 to parse the sequence of tokens and perform syntax validation on the sequence of tokens. For this example, syntax rules 125 are automatically generated (e.g., by the computing system on which parser 130 operates) from knowledge graph metadata 120. As mentioned above, knowledge graph metadata 120 can include data about a knowledge graph of an ontology of data. Syntax rules 125 are also generated using token definitions 110. After generating the data structure, parser 130 sends it to compiler 135 for further processing.

Compiler 135 is configured to compile data structures into programming instructions that are in lower-level native code languages 140*a-n*. For example, when compiler 135 receives a data structure from parser 130, compiler 135 converts it into a set of programming instructions that is in one of the native codes 140*a-n*. The programming instructions can then be executed (e.g., by a computing system) in the native environment of the native code 140. Examples of native code languages include structured query language (SQL), Java, C, C++, Python, etc.

Figure 2:
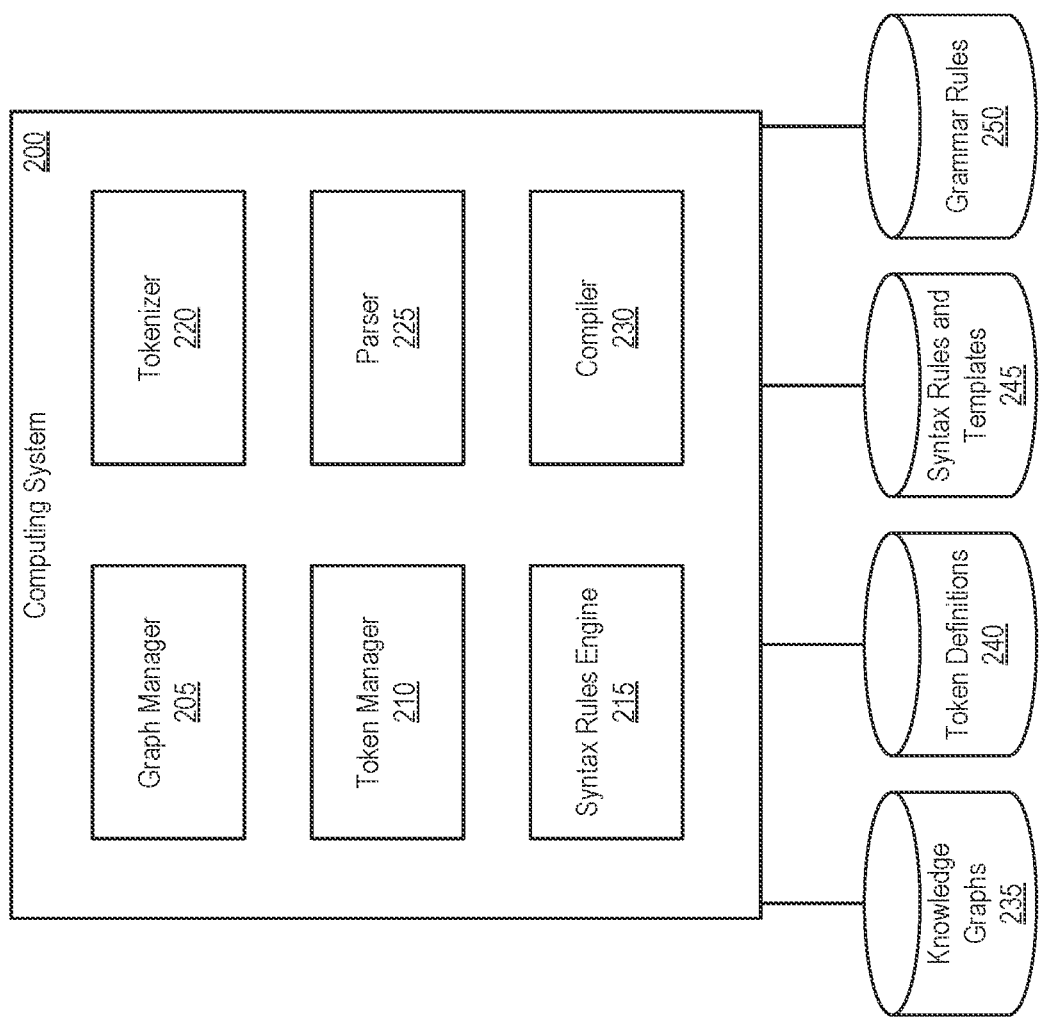
FIG. 2 illustrates a computing system that processes high-level programming languages defined based on knowledge graphs according to some embodiments.

FIG. 2 illustrates a computing system 200 that processes high-level programming languages defined based on knowledge graphs according to some embodiments. As shown, computing system 200 includes graph manager 205, token manager 210, syntax rules engine 215, tokenizer 220, parser 225, compiler 230, and storages 235-250. In this example, tokenizer 220, parser 225, and compiler 230 is implemented by tokenizer 115, parser 130, and compiler 13, respectively. Knowledge graph storage 235 is configured to store knowledge graphs of ontologies of data. In some embodiments, the knowledge graphs are represented using a web ontology language (OWL), a resource description framework (RDF) schema, or an ontology inference layer (OIL). Token definitions storage 240 stores token definitions. Syntax rules and templates storage 245 stores syntax rules and syntax rule templates. Grammar rules storage 250 is configured to store different grammar rules for different languages (e.g., English, French, Spanish, German, Japanese, etc.). In some embodiments, storages 235-250 are implemented in a single physical storage while, in other embodiments, storages 235-250 may be implemented across several physical storages. While FIG. 1 shows storages 235-250 as external to computing system 200, one of ordinary skill in the art will appreciate that knowledge graphs storage 235, token definitions storage 240, syntax rules and templates storage 245, and/or grammar rules storage 250 may be part of computing system 200 in some embodiments.

Graph manager 205 handles the management of knowledge graphs. For instance, graph manager 205 may receive a request from computing system 200 to extract metadata associated with a knowledge graph. As mentioned above, metadata associated with a knowledge graph can include the entities represented by nodes of the knowledge graph, the relationships represented by edges connecting the nodes of the knowledge graph, properties of entities, actions associated with entities, etc. In response to such a request, graph manager 205 retrieves the knowledge graph from knowledge graphs storage 235, extracts metadata associated with the knowledge graph, and sends the extracted metadata to token manager 210.

Token manager 210 is configured to manage token definitions. For example, token manager 210 can metadata associated with a knowledge graph from graph manager 205. In response to receiving the metadata, token manager 210 uses a particular set of token definitions and the metadata to generate a set of tokens to be used (e.g., by tokenizer 220) for tokenizing character streams. For instance, token manager 210 can iterate through each entity in the metadata and generate a token for each property, relationship, action, etc. associated with the entity. When token manager 210 finishes generating the set of tokens, token manager 210 sends the set of tokens and the metadata associated with the knowledge graph to syntax rules engine 215.

Syntax rules engine 215 is responsible for generating syntax rules. For instance, when syntax rules engine 215 receives a set of tokens and metadata associated with a knowledge graph from token manager 210, syntax rules engine 215 uses them to generate a set of syntax rules. In some cases, syntax rules engine 215 uses syntax templates to generate syntax rules. Alternatively, or in conjunction with syntax templates, syntax rules engine 215 may use a set of linguistic rules to generate syntax rules. The set of syntax rules may be used (e.g., by parser 225) for parsing sequences of tokens.

Figure 3:
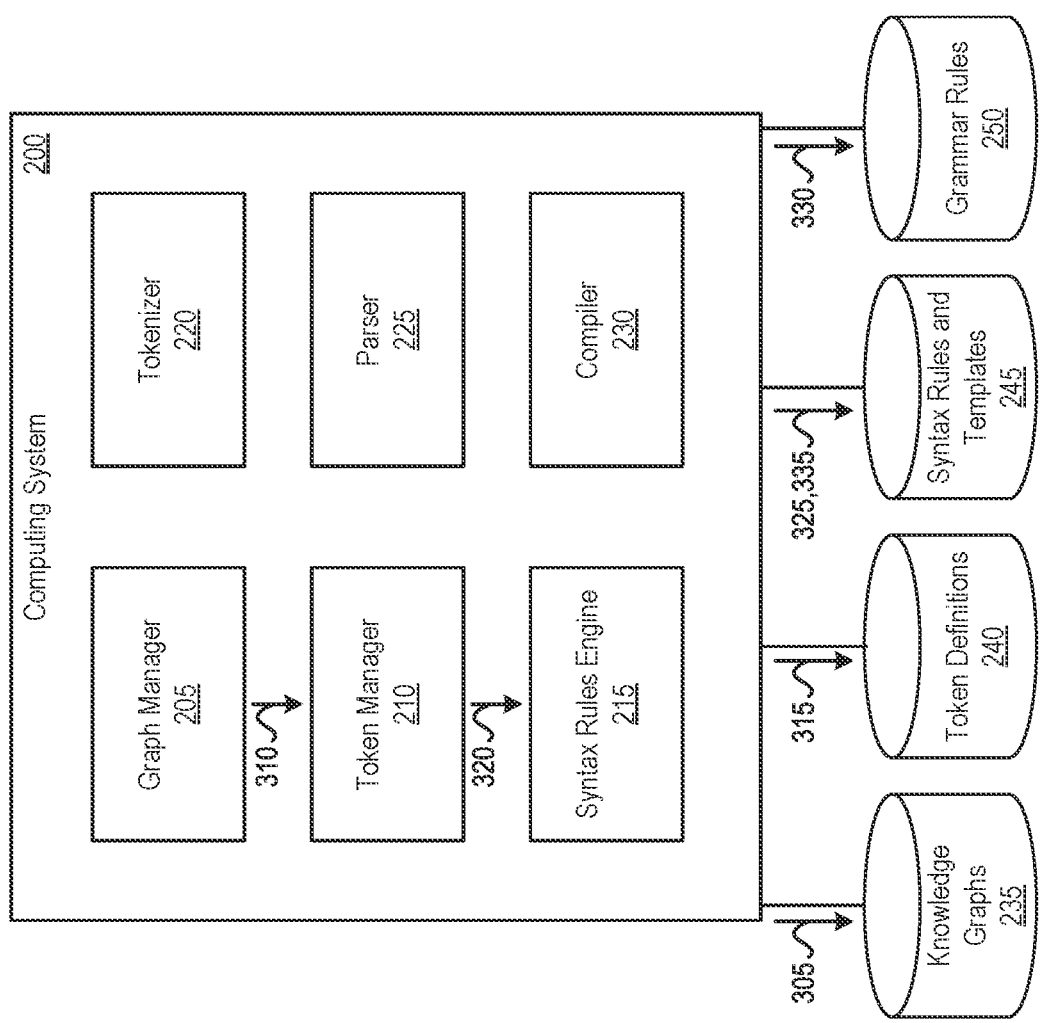
FIG. 3 illustrates an example operation of the computing system illustrated in FIG. 2 according to some embodiments.

FIG. 3 illustrates an example operation of computing system 200 according to some embodiments. Specifically, the operation illustrates an example of how syntax rules are generated based on a knowledge graph of an ontology of data. The operation may be performed during design time (e.g., during the development of an application). The operation starts by computing system 200 sending graph manager 205 a request to extract metadata associated with a knowledge graph of an ontology of data. In response to the request, graph manager 205 accesses, at 305, knowledge graphs storage 235 and retrieves the requested knowledge graph.

Figure 4:
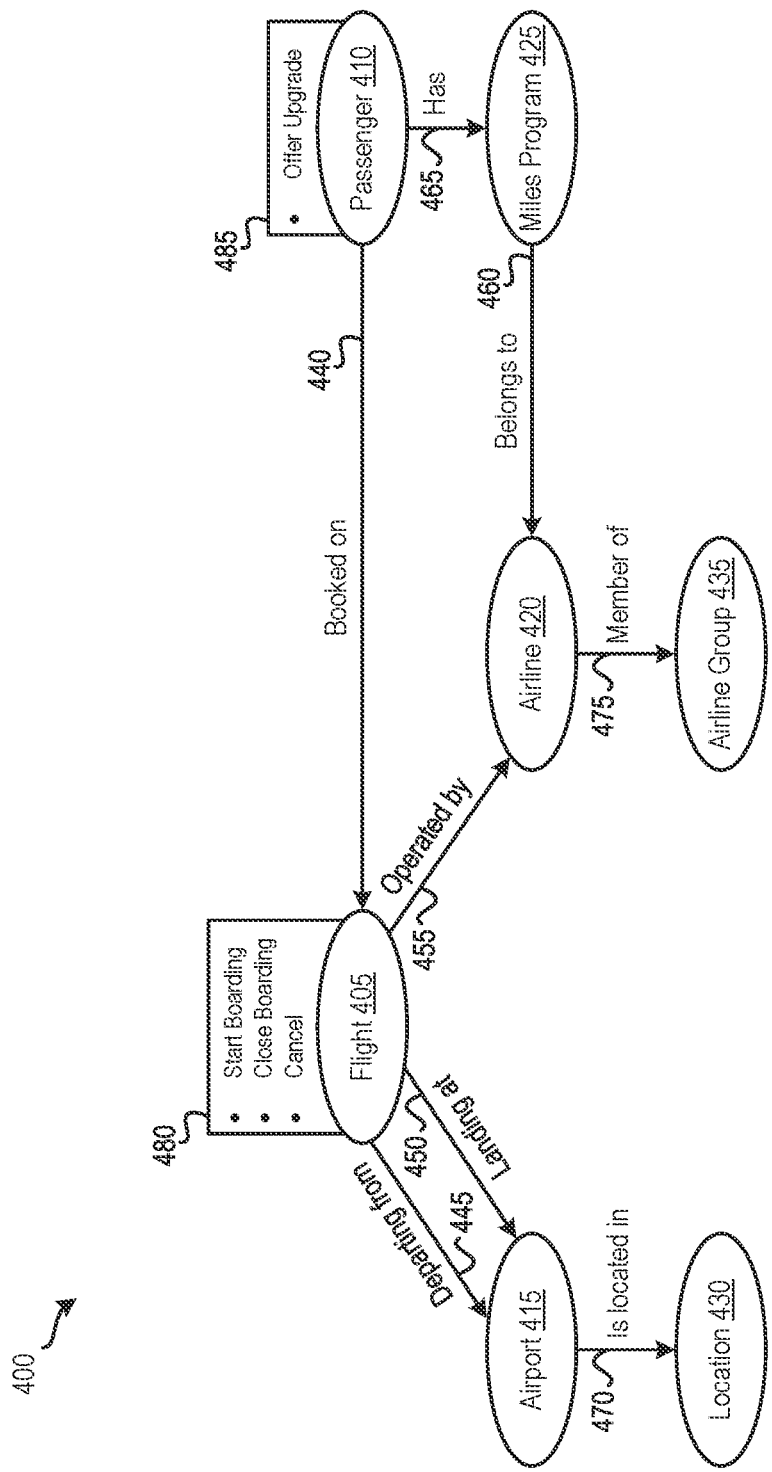
FIG. 4 illustrates an example knowledge graph according to some embodiments.

FIG. 4 illustrates an example knowledge graph 400 according to some embodiments. Specifically, knowledge graph 400 is a knowledge graph of an ontology of flight data that will be used in this example. As shown, knowledge graph 400 includes nodes 405-435 and edges 440-470. Node 405 represents a flight entity, node 410 represents a passenger entity, node 415 represents an airport entity, node 420 represents an airline entity, node 425 represents a miles program entity, node 430 represents a location entity, and node 435 represents an airline group entity. Edge 440 represents a relationship between a passenger entity and a flight entity (e.g., a particular passenger can be booked on a particular flight). Edge 445 represents a relationship between a flight entity and an airport entity (e.g., a particular flight can be departing from a particular airport). Edge 450 represents another relationship between a flight entity and an airport entity (e.g., a particular flight can be landing at a particular airport). Edge 455 represents a relationship between a flight entity and an airline entity (e.g., a particular flight can be operated by a particular airline. Edge 460 represents a relationship between a miles program entity and an airline entity (e.g., a particular miles program belongs to a particular airline). Edge 465 represents a relationship between a passenger entity and a miles program entity (e.g., a particular passenger can have a miles program). Edge 470 represents a relationship between an airport entity and a location entity (e.g., a particular airport can be located in a particular location). Edge 475 represents a relationship between an airline entity and an airline group entity (e.g., a particular airline can be a member of a particular airline group). Entities can have actions associated with them. For example, knowledge graph 400 shows actions associated with flight entity 405 and passenger entity 410. In particular, flight entity may have a start boarding action, a close boarding action, and a cancel action associated with it. Also, a passenger entity can have an offer upgrade action associated with it. In addition, a particular entity may have properties associated with it (not shown). For instance, a passenger entity may have a name property that represents the name of the passenger, an age property that represents the age of the passenger, a birthdate property that represents the birthdate of the passenger. A flight entity can have a flight number property that represents the flight number of the flight, a departure date property that property that represents the date on which the flight is to depart, a free seats property that represents the number of free seats on the flight, etc.

Figure 5:
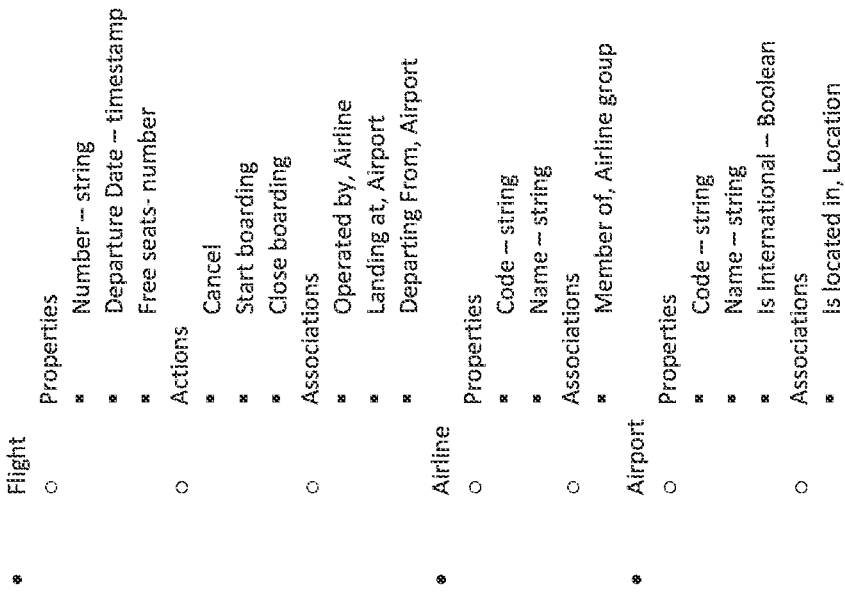
FIG. 5 illustrates an example of some metadata extracted from the knowledge graph illustrated in FIG. 4 according to some embodiments.

Returning to the example operation in FIG. 3, after graph manager 205 retrieves knowledge graph 400, graph manager 205 iterates through each of the nodes 405-435 and edges 440-475 to extract metadata associated with knowledge graph 400. For this example, graph manager 205 extracts properties, actions, and relationships associated with each entity in knowledge graph 400. FIG. 5 illustrates an example of some metadata 500 extracted from knowledge graph 400 according to some embodiments. Specifically, metadata 500 includes metadata extracted from the flight entity, airline entity, and airport entity shown in knowledge graph 400. For the flight entity, graph manager 205 extracted a number property, a departure date property, a free seat property, a cancel action, a start boarding action, a close boarding action, a operated by relationship with an airline entity, a landing at relationship with an airport entity, and a departing from relationship with an airport entity. For the airline entity, graph manager 205 extracted a code property, a name property, and a member of relationship with an airline group entity. For the airport entity, graph manager 205 extracted a code property, a name property, and an is international property, and an is located in relationship with a location entity. Upon extracting all the metadata from knowledge graph 400, graph manager 205 sends, at 310, the metadata to token manager 210.

Figure 6:
FIG. 6 illustrates example token definitions according to some embodiments.

Once token manager 210 receives the extracted metadata from graph manager 205, token manager 210 accesses, at 315, token definitions storage 240 to retrieve a set of token definitions associated with knowledge graph 400. FIG. 6 illustrates example token definitions 600 according to some embodiments. In particular, token definitions 600 are some of the token definitions associated with knowledge graph 400 in this example. As shown, token definitions 600 includes several token definitions that specify reserve words and/or token patterns. For instance, the string '(' is defined as the token LPAREN, the string ')' is defined as the token RPAREN, the string '&' is defined as the token AND, etc. In some cases a token definition specifies several strings for the same token. For example, the strings 'passengers' and 'travelers' are both defined for the token PASSENGERS, the strings 'show' and 'display' are both defined for the token SHOW, etc.

Returning to the example operation illustrated in FIG. 3, after token manager 210 retrieves the set of token definitions associated with knowledge graph 400, token manager 210 creates tokens for the metadata associated with knowledge graph 400. In some embodiments, token manager 210 iterates through each entity in the metadata (e.g., metadata 500) and creates a token to represent entity, a token to represent teach property associated with the entity, a token to represent each action associated with the entity, and a token to represent each relationship associated with the entity. When token manager 210 finishes creating tokens, token manager 210 sends, at 320, the created tokens, the set of token definitions, and the metadata to syntax rules engine 215.

In response to receiving the created tokens, the set of token definitions, and the metadata associated with knowledge graph 400 from token manager 210, syntax rules engine 215 accesses, at 325, syntax rules and templates storage 245 to retrieve a set of syntax rules templates and accesses, at 330, grammar rules storage 250, to retrieve a set of grammar rules for a particular language. In some embodiments, a syntax rule template specifies a specific structure in which to generate a syntax rule. FIG. 7 illustrates example syntax rule templates 700 according to some embodiments. As shown, syntax rule templates 700 includes four syntax rule templates 705-720. Syntax rule template 705 specifies relationship, a property of a related entity, a comparison operator, and a value. Syntax rule template 710 specifies a property, a comparison operator, and a value. Syntax rule template 715 specifies an action, a filter term, and an entity. Syntax rule template 720 specifies an action, a filter term, and an entity, a comparison operator, and a value. In some embodiments, to generate syntax rules using a particular syntax rule template, syntax rules engine 215 iterates through the extracted metadata and generates all the possible permutations of combinations of the metadata that conform to the particular syntax rule template. The set of grammar rules may be used to modify generated syntax rules so that they confirm to the set of grammar rules. For example, if the set of grammar rules are for the English language, it may include a rule that specifies when to use singular or plural versions of a noun, a rule that modifies verbs and/or nouns so that agree grammatically, (e.g., singular verbs are used with singular nouns, plural verbs are used with plural nouns, etc.), etc. FIG. 8 illustrates example syntax rules 800 according to some embodiments. In particular, syntax rules 800 includes three syntax rules 805-815. Syntax rule 805 defines a structure for a command to show passenger entities that meet one or more conditional expressions. Syntax rule 810 defines a structure for a command to offer an upgrade to passenger entities that meet one or more conditional expressions. Syntax rule 815 defines a structure for a command to offer an upgrade to all passenger entities. In this example, syntax rules engine 215 created syntax rule 815 based on syntax rule template 715. After generating all the syntax rules, syntax rules engine 215 stores, at 335, them in syntax rules and templates storage 245.

Figure 9:
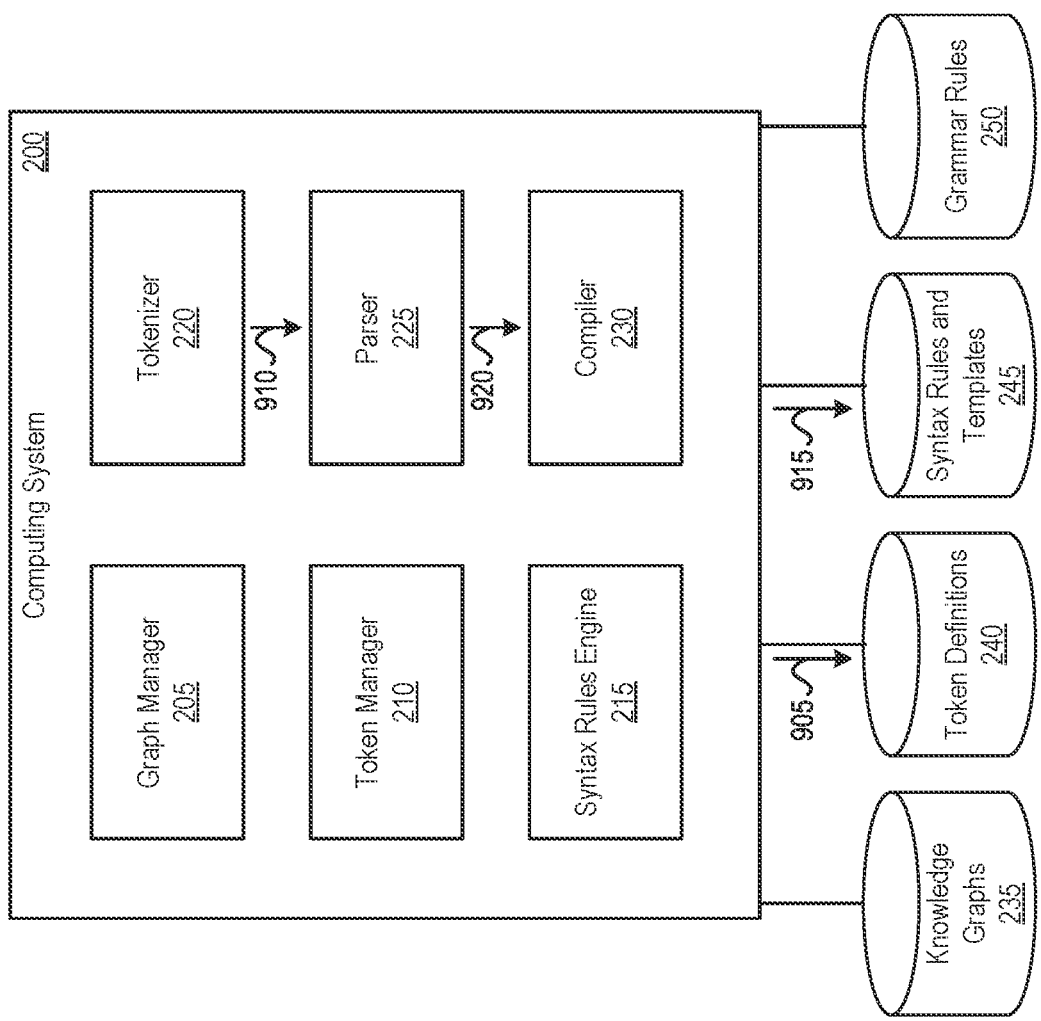
FIG. 9 illustrates another example operation of the computing system illustrated in FIG. 2 according to some embodiments.

FIG. 9 illustrates another example operation of computing system 200 according to some embodiments. In particular, the operation depicts an example of how a stream of character input is processed by an application (not shown) operating on computing system 200. The operation may be performed during run time (e.g., during the execution of an application). For this example, computing system 200 uses the token definitions associated with, and the syntax rules generated for, knowledge graph 400, as described above by reference to FIGS. 3-8.

The operation begins by computing system 200 receiving a stream of characters (e.g., input 105) from a user (e.g., via a client device or an interface provided by computing system 200). When computing system 200 receives the stream of characters, computing system 200 sends it to tokenizer 220. Upon receiving the stream of characters, tokenizer 220 accesses, at 905, token definitions storage 240, the set of token definitions associated with knowledge graph 400. Using the set of token definitions, tokenizer 220 converts the stream of characters into a sequence of tokens. Then, tokenizer 220 sends, at 910, the sequence of tokens to parser 225.

In response to receiving the sequence of tokens, parser 225 accesses, at 915, syntax rules and templates storage 245 to retrieve a set of syntax rules generated from knowledge graph 400. Next, parser 225 uses the set of syntax rules to parse the sequence of tokens and perform syntax validation and error handling in order to generate a data structure that represents the structure of the stream of characters. In this example, the data structure is an AST data structure. Parser 225 then sends, at 920, the data structure compiler 230. Upon receiving the data structure, compiler 230 converts it into programming instructions that is in a native code. The programming instructions can then be executed (e.g., by computing system 200) in the native environment of the native code. For example, computing system 200 may include an SQL database of data modeled according to knowledge graph 400. In such an example, the data structure is compiled into SQL instructions (e.g., a set of queries), which computing system 200 may then execute to access data stored in the SQL database according input provided in the stream of characters.

Figure 10:
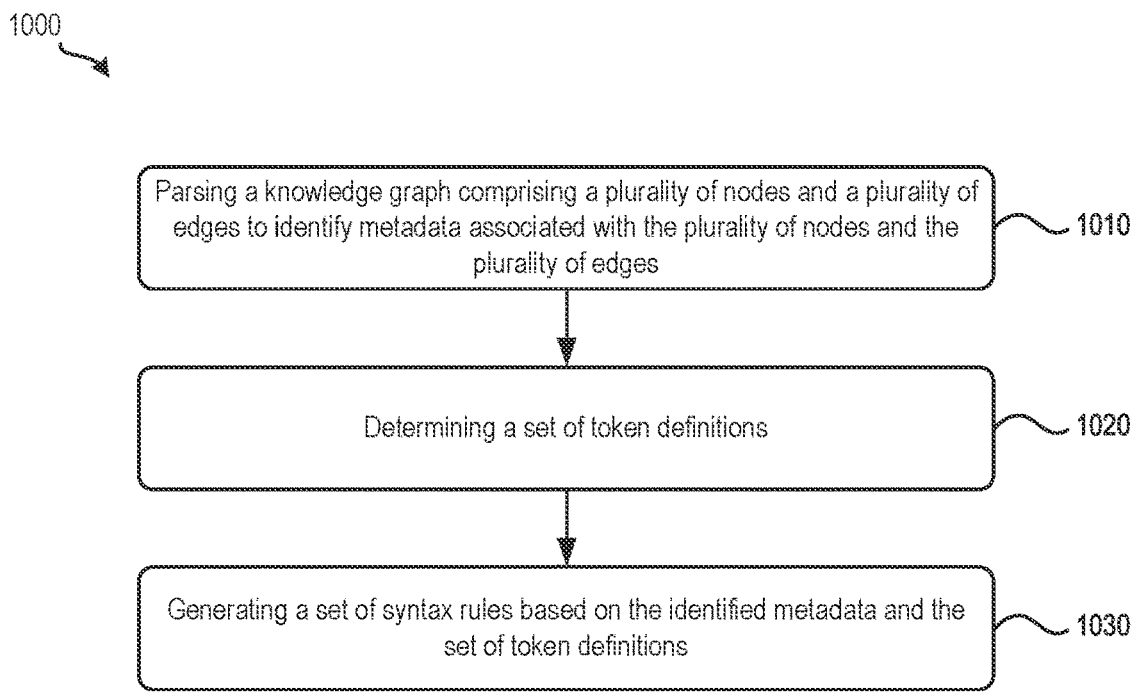
FIG. 10 illustrates a process for defining a high-level programing language based on a knowledge graph according to some embodiments.

FIG. 10 illustrates a process 1000 for defining a high-level programming language based on a knowledge graph according to some embodiments. In some embodiments, computing system 200 performs process 100. Process 100 starts by parsing, at 1010, a knowledge graph comprising a plurality of nodes and a plurality of edges to identify metadata associated with the plurality of nodes and the plurality of edges. Each edge in the plurality of edges connects a pair of nodes in the plurality of nodes. Each node in the plurality of nodes represents an entity. Each edge in the plurality of edges connecting a particular pair of nodes in the plurality of nodes represents a relationship between two entities represented by the particular pair of nodes. Referring to FIGS. 2, 4, and 5 as an example, graph manager 205 may retrieve knowledge graph 400 from knowledge graphs storage 235 and parse it to extract metadata associated with knowledge graph 400. Metadata 500 includes examples of metadata extracted from knowledge graph 400.

Next, process 1000 determines, at 1020, a set of token definitions. Referring to FIGS. 3 and 6 as an example, token manager 210 can determine the set tokens by retrieving from tokens definitions storage 240 a set of token definitions associated with knowledge graph 400. FIG. 6 illustrates example token definitions 600 that include some of the token definitions associated with knowledge graph 400.

Finally, process 1000 generates, at 1030, a set of syntax rules based on the identified metadata and the set of token definitions. Referring to FIGS. 3, 5, and 8 as an example, syntax rules engine 215 may generate the set of syntax rules based on metadata 500 and the set of token definitions associated with knowledge graph 400. Syntax rules 800 include some examples of syntax rules generated based on knowledge graph 400.

Figure 11:
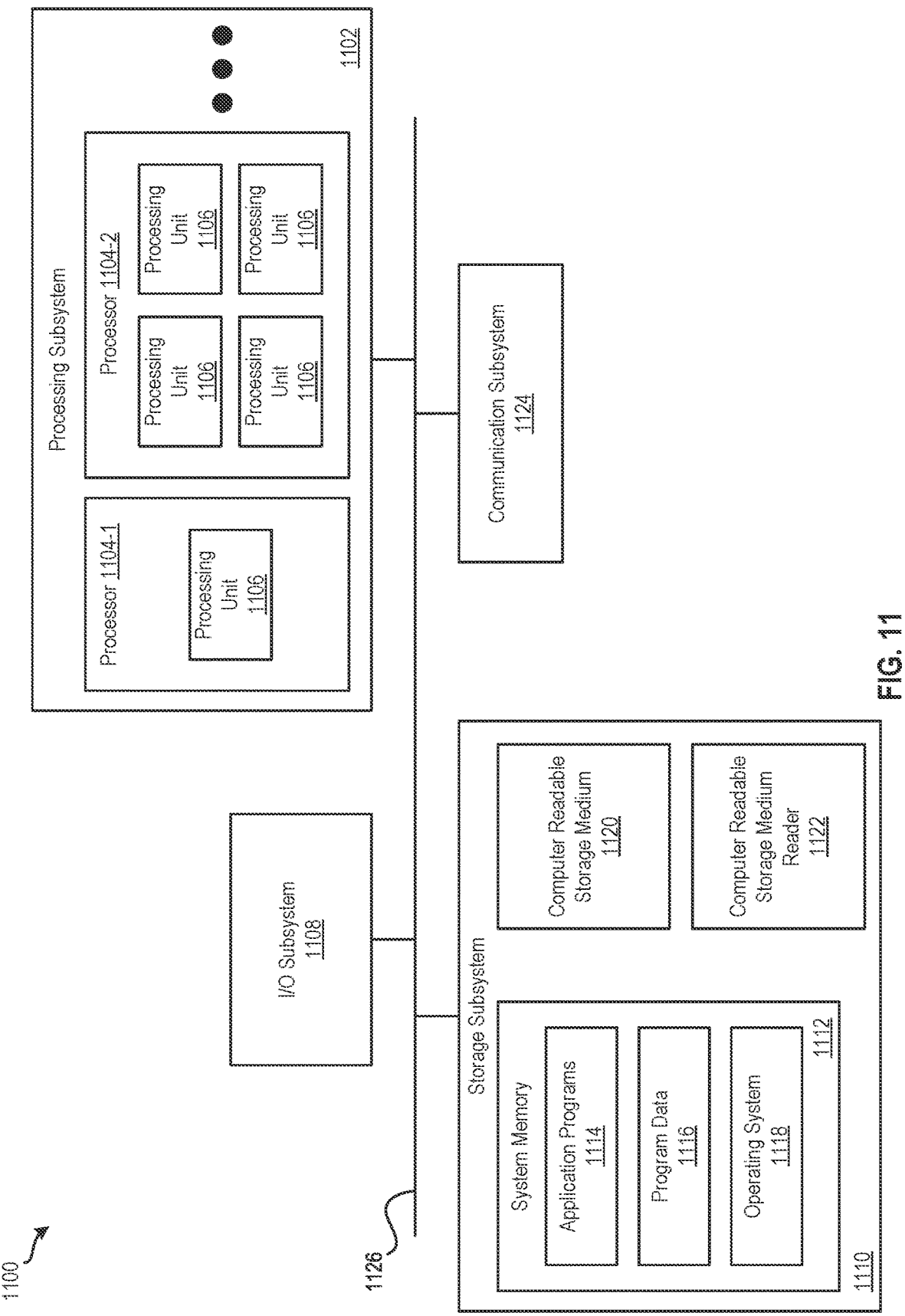
FIG. 11 illustrates an exemplary computer system, in which various embodiments may be implemented.

FIG. 11 illustrates an exemplary computer system 1100 for implementing various embodiments described above. For example, computer system 1100 may be used to implement system 100 and computing system 200. Computer system 1100 may be a desktop computer, a laptop, a server computer, or any other type of computer system or combination thereof. Some or all elements of tokenizer 115, parser 130, and compiler 135, graph manager 205, token manager 210, syntax rules engine 215, tokenizer 220, parser 225, compiler 230, or combinations thereof can be included or implemented in computer system 1100. In addition, computer system 1100 can implement many of the operations, methods, and/or processes described above (e.g., process 1000). As shown in FIG. 11, computer system 1100 includes processing subsystem 1102, which communicates, via bus subsystem 1126, with input/output (I/O) subsystem 1108, storage subsystem 1110 and communication subsystem 1124.

Bus subsystem 1126 is configured to facilitate communication among the various components and subsystems of computer system 1100. While bus subsystem 1126 is illustrated in FIG. 11 as a single bus, one of ordinary skill in the art will understand that bus subsystem 1126 may be implemented as multiple buses. Bus subsystem 1126 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1102, which can be implemented as one or more integrated circuits (e.g., a conventional microprocessor or microcontroller), controls the operation of computer system 1100. Processing subsystem 1102 may include one or more processors 1104. Each processor 1104 may include one processing unit 1106 (e.g., a single core processor such as processor 1104-1) or several processing units 1106 (e.g., a multicore processor such as processor 1104-2). In some embodiments, processors 1104 of processing subsystem 1102 may be implemented as independent processors while, in other embodiments, processors 1104 of processing subsystem 1102 may be implemented as multiple processors integrate into a single chip or multiple chips. Still, in some embodiments, processors 1104 of processing subsystem 1102 may be implemented as a combination of independent processors and multiple processors integrated into a single chip or multiple chips.

In some embodiments, processing subsystem 1102 can execute a variety of programs or processes in response to program code and can maintain multiple concurrently executing programs or processes. At any given time, some or all of the program code to be executed can reside in processing subsystem 1102 and/or in storage subsystem 1110. Through suitable programming, processing subsystem 1102 can provide various functionalities, such as the functionalities described above by reference to process 1000, etc.

I/O subsystem 1108 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1100 to a user or another device (e.g., a printer).

As illustrated in FIG. 11, storage subsystem 1110 includes system memory 1112, computer-readable storage medium 1120, and computer-readable storage medium reader 1122. System memory 1112 may be configured to store software in the form of program instructions that are loadable and executable by processing subsystem 1102 as well as data generated during the execution of program instructions. In some embodiments, system memory 1112 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1112 may include different types of memory, such as static random access memory (SRAM) and/or dynamic random access memory (DRAM). System memory 1112 may include a basic input/output system (BIOS), in some embodiments, that is configured to store basic routines to facilitate transferring information between elements within computer system 1100 (e.g., during start-up). Such a BIOS may be stored in ROM (e.g., a ROM chip), flash memory, or any other type of memory that may be configured to store the BIOS.

As shown in FIG. 11, system memory 1112 includes application programs 1114 (e.g., client application 110a-n), program data 1116, and operating system (OS) 1118. OS 1118 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1120 may be a non-transitory computer-readable medium configured to store software (e.g., programs, code modules, data constructs, instructions, etc.). Many of the components (e.g., tokenizer 115, parser 130, and compiler 135, graph manager 205, token manager 210, syntax rules engine 215, tokenizer 220, parser 225, and compiler 230) and/or processes (e.g., process 1000) described above may be implemented as software that when executed by a processor or processing unit (e.g., a processor or processing unit of processing subsystem 1102) performs the operations of such components and/or processes. Storage subsystem 1110 may also store data used for, or generated during, the execution of the software.

Storage subsystem 1110 may also include computer-readable storage medium reader 1122 that is configured to communicate with computer-readable storage medium 1120. Together and, optionally, in combination with system memory 1112, computer-readable storage medium 1120 may comprehensively represent remote, local, fixed, and/or removable storage devices plus storage media for temporarily and/or more permanently containing, storing, transmitting, and retrieving computer-readable information.

Computer-readable storage medium 1120 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1124 serves as an interface for receiving data from, and transmitting data to, other devices, computer systems, and networks. For example, communication subsystem 1124 may allow computer system 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1124 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1124 may provide components configured for wired communication (e.g., Ethernet) in addition to or instead of components configured for wireless communication.

One of ordinary skill in the art will realize that the architecture shown in FIG. 11 is only an example architecture of computer system 1100, and that computer system 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
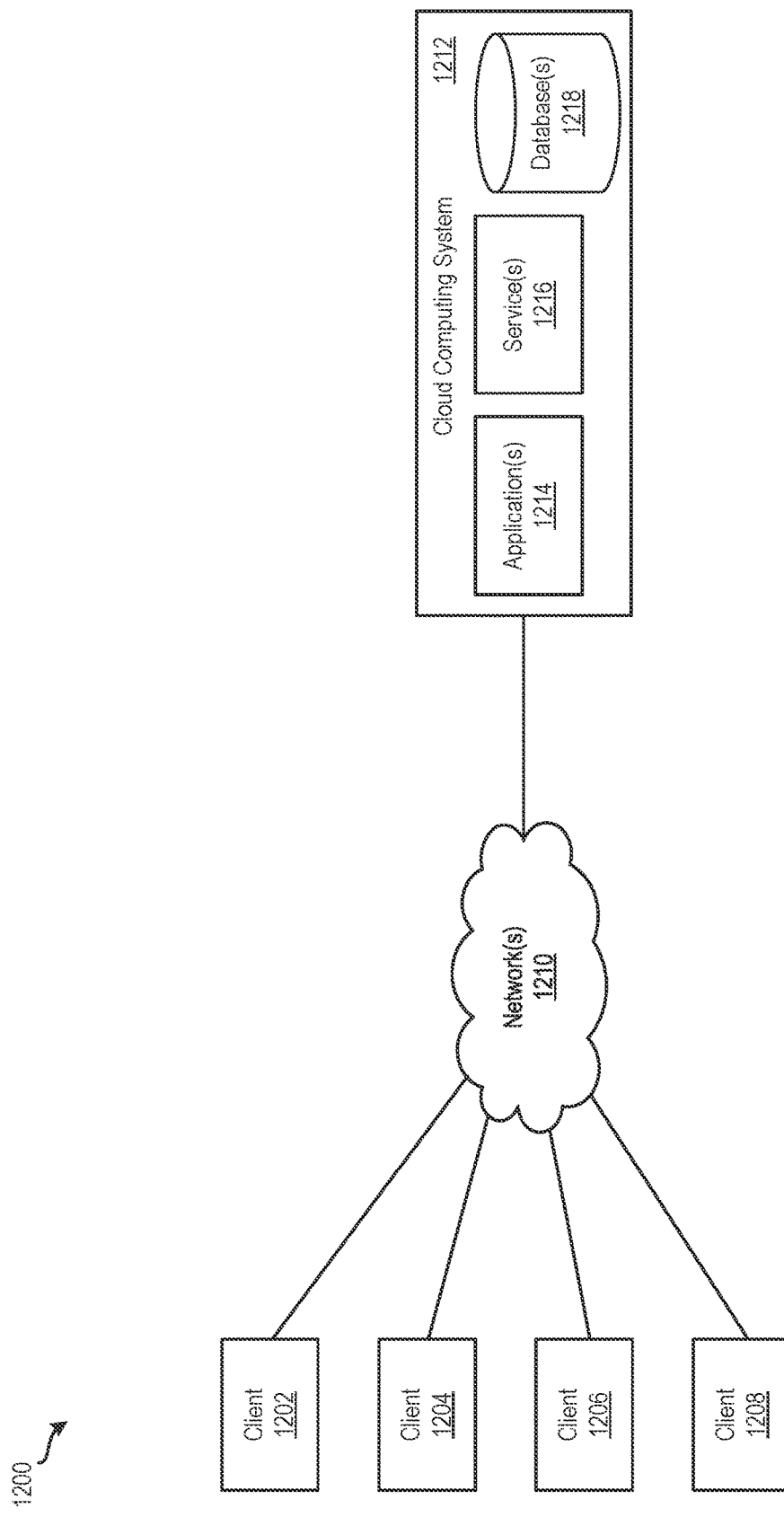
FIG. 12 illustrates an exemplary system, in which various embodiments may be implemented.

FIG. 12 illustrates an exemplary system 1200 for implementing various embodiments described above. For example, cloud computing system 912 may be used to implement system 100 and computing system 200. As shown, system 1200 includes client devices 1202-1208, one or more networks 1210, and cloud computing system 1212. Cloud computing system 1212 is configured to provide resources and data to client devices 1202-1208 via networks 1210. In some embodiments, cloud computing system 1200 provides resources to any number of different users (e.g., customers, tenants, organizations, etc.). Cloud computing system 1212 may be implemented by one or more computer systems (e.g., servers), virtual machines operating on a computer system, or a combination thereof.

As shown, cloud computing system 1212 includes one or more applications 1214, one or more services 1216, and one or more databases 1218. Cloud computing system 1200 may provide applications 1214, services 1216, and databases 1218 to any number of different customers in a self-service, subscription-based, elastically scalable, reliable, highly available, and secure manner.

In some embodiments, cloud computing system 1200 may be adapted to automatically provision, manage, and track a customer's subscriptions to services offered by cloud computing system 1200. Cloud computing system 1200 may provide cloud services via different deployment models. For example, cloud services may be provided under a public cloud model in which cloud computing system 1200 is owned by an organization selling cloud services and the cloud services are made available to the general public or different industry enterprises. As another example, cloud services may be provided under a private cloud model in which cloud computing system 1200 is operated solely for a single organization and may provide cloud services for one or more entities within the organization. The cloud services may also be provided under a community cloud model in which cloud computing system 1200 and the cloud services provided by cloud computing system 1200 are shared by several organizations in a related community. The cloud services may also be provided under a hybrid cloud model, which is a combination of two or more of the aforementioned different models.

In some instances, any one of applications 1214, services 1216, and databases 1218 made available to client devices 1202-1208 via networks 1210 from cloud computing system 1200 is referred to as a "cloud service." Typically, servers and systems that make up cloud computing system 1200 are different from the on-premises servers and systems of a customer. For example, cloud computing system 1200 may host an application and a user of one of client devices 1202-1208 may order and use the application via networks 1210.

Applications 1214 may include software applications that are configured to execute on cloud computing system 1212 (e.g., a computer system or a virtual machine operating on a computer system) and be accessed, controlled, managed, etc. via client devices 1202-1208. In some embodiments, applications 1214 may include server applications and/or mid-tier applications (e.g., HTTP (hypertext transport protocol) server applications, FTP (file transfer protocol) server applications, CGI (common gateway interface) server applications, JAVA server applications, etc.). Services 1216 are software components, modules, application, etc. that are configured to execute on cloud computing system 1212 and provide functionalities to client devices 1202-1208 via networks 1210. Services 1216 may be web-based services or on-demand cloud services.

Databases 1218 are configured to store and/or manage data that is accessed by applications 1214, services 1216, and/or client devices 1202-1208. For instance, storages 140 and 145 may be stored in databases 1218. Databases 1218 may reside on a non-transitory storage medium local to (and/or resident in) cloud computing system 1212, in a storage-area network (SAN), on a non-transitory storage medium local located remotely from cloud computing system 1212. In some embodiments, databases 1218 may include relational databases that are managed by a relational database management system (RDBMS). Databases 1218 may be a column-oriented databases, row-oriented databases, or a combination thereof. In some embodiments, some or all of databases 1218 are in-memory databases. That is, in some such embodiments, data for databases 1218 are stored and managed in memory (e.g., random access memory (RAM)).

Client devices 1202-1208 are configured to execute and operate a client application (e.g., a web browser, a proprietary client application, etc.) that communicates with applications 1214, services 1216, and/or databases 1218 via networks 1210. This way, client devices 1202-1208 may access the various functionalities provided by applications 1214, services 1216, and databases 1218 while applications 1214, services 1216, and databases 1218 are operating (e.g., hosted) on cloud computing system 1200. Client devices 1202-1208 may be computer system 1100, as described above by reference to FIG. 11. Although system 1200 is shown with four client devices, any number of client devices may be supported.

Networks 1210 may be any type of network configured to facilitate data communications among client devices 1202-1208 and cloud computing system 1212 using any of a variety of network protocols. Networks 1210 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
parsing a knowledge graph comprising a plurality of nodes and a plurality of edges to identify metadata associated with the plurality of nodes and the plurality of edges, wherein each edge in the plurality of edges connects a pair of nodes in the plurality of nodes, wherein each node in the plurality of nodes represents an entity, wherein each edge in the plurality of edges connecting a particular pair of nodes in the plurality of nodes represents a relationship between two entities represented by the particular pair of nodes;
determining a set of token definitions;
generating a set of syntax rules based on the identified metadata and the set of token definitions;
receiving as input a stream of characters;
based on the set of token definitions, generating a sequence of tokens from the stream of characters;
parsing the sequence of tokens to generate a data structure representing a structure of the stream of characters; and
compiling the data structure to convert the data structure into a set of programming instructions in a programming language.

2. The non-transitory machine-readable medium of claim 1, wherein parsing the knowledge graph comprises:
extracting each entity from the plurality of entities represented by the plurality of nodes in the knowledge graph, wherein the identified metadata comprises the plurality of entities; and
for each entity in a subset of the plurality of entities, determining a set of attributes associated with the entity, wherein the identified metadata comprises the set of attributes associated with the entity.

3. The non-transitory machine-readable medium of claim 1, wherein parsing the knowledge graph comprises:
extracting each entity from the plurality of entities represented by the plurality of nodes in the knowledge graph, wherein the identified metadata comprises the plurality of entities; and
for each entity in a subset of the plurality of entities, determining a set of relationships with a set of other entities, wherein the identified metadata comprises the set of relationships.

4. The non-transitory machine-readable medium of claim 1, wherein parsing the knowledge graph comprises:
extracting each entity from the plurality of entities represented by the plurality of nodes in the knowledge graph, wherein the identified metadata comprises the plurality of entities; and
for each entity in a subset of the plurality of entities, determining a set of actions associated with the entity, wherein the identified metadata comprises the set of actions associated with the entity.

5. The non-transitory machine-readable medium of claim 1, wherein generating the set of syntax rules comprises:
for each entity in the plurality of entities:
creating a token representing the entity,
for each property associated with the entity, creating a token representing the property,
for each action associated with the entity, creating a token representing the action, and
for each relationship associated with the entity, creating a token representing the relationship.

6. The non-transitory machine-readable medium of claim 5, wherein generating the set of syntax rules is further based on the created tokens and a predefined set of syntax rule templates.

7. The non-transitory machine-readable medium of claim 1, wherein the knowledge graph is for representing an ontology of data.

8. A method comprising:
parsing a knowledge graph comprising a plurality of nodes and a plurality of edges to identify metadata associated with the plurality of nodes and the plurality of edges, wherein each edge in the plurality of edges connects a pair of nodes in the plurality of nodes, wherein each node in the plurality of nodes represents an entity, wherein each edge in the plurality of edges connecting a particular pair of nodes in the plurality of nodes represents a relationship between two entities represented by the particular pair of nodes;

determining a set of token definitions;

generating a set of syntax rules based on the identified metadata and the set of token definitions;

receiving as input a stream of characters;

based on the set of token definitions, generating a sequence of tokens from the stream of characters;

parsing the sequence of tokens to generate a data structure representing a structure of the stream of characters; and compiling the data structure to convert the data structure into a set of programming instructions in a programming language.

9. The method of claim 8, wherein parsing the knowledge graph comprises:

extracting each entity from the plurality of entities represented by the plurality of nodes in the knowledge graph, wherein the identified metadata comprises the plurality of entities; and for each entity in a subset of the plurality of entities, determining a set of attributes associated with the entity, wherein the identified metadata comprises the set of attributes associated with the entity.

10. The method of claim 8, wherein parsing the knowledge graph comprises:

extracting each entity from the plurality of entities represented by the plurality of nodes in the knowledge graph, wherein the identified metadata comprises the plurality of entities; and for each entity in a subset of the plurality of entities, determining a set of relationships with a set of other entities, wherein the identified metadata comprises the set of relationships.

11. The method of claim 8, wherein parsing the knowledge graph comprises:

extracting each entity from the plurality of entities represented by the plurality of nodes in the knowledge graph, wherein the identified metadata comprises the plurality of entities; and for each entity in a subset of the plurality of entities, determining a set of actions associated with the entity, wherein the identified metadata comprises the set of actions associated with the entity.

12. The method of claim 8, wherein generating the set of syntax rules comprises:

for each entity in the plurality of entities:
creating a token representing the entity,
for each property associated with the entity, creating a token representing the property,
for each action associated with the entity, creating a token representing the action, and
for each relationship associated with the entity, creating a token representing the relationship.

13. The method of claim 12, wherein generating the set of syntax rules is further based on the created tokens and a predefined set of syntax rule templates.

14. The method of claim 8, wherein the knowledge graph is for representing an ontology of data.

15. A system comprising:
a set of processing units; and
a non-transitory machine-readable medium storing instructions that when executed by at least one processing unit in the set of processing units cause the at least one processing unit to:

parse a knowledge graph comprising a plurality of nodes and a plurality of edges to identify metadata associated with the plurality of nodes and the plurality of edges, wherein each edge in the plurality of edges connects a pair of nodes in the plurality of nodes, wherein each node in the plurality of nodes represents an entity, wherein each edge in the plurality of edges connecting a particular pair of nodes in the plurality of nodes represents a relationship between two entities represented by the particular pair of nodes;

determine a set of token definitions;

generate a set of syntax rules based on the identified metadata and the set of token definitions;

receive as input a stream of characters;

based on the set of token definitions, generate a sequence of tokens from the stream of characters;

parse the sequence of tokens to generate a data structure representing a structure of the stream of characters; and compile the data structure to convert the data structure into a set of programming instructions in a programming language.

16. The system of claim 15, wherein parsing the knowledge graph comprises:

extracting each entity from the plurality of entities represented by the plurality of nodes in the knowledge graph, wherein the identified metadata comprises the plurality of entities; and for each entity in a subset of the plurality of entities, determining a set of attributes associated with the entity, wherein the identified metadata comprises the set of attributes associated with the entity.

17. The system of claim 15, wherein parsing the knowledge graph comprises:

extracting each entity from the plurality of entities represented by the plurality of nodes in the knowledge graph, wherein the identified metadata comprises the plurality of entities;

and for each entity in a subset of the plurality of entities, determining a set of relationships with a set of other entities, wherein the identified metadata comprises the set of relationships.

18. The system of claim 15, wherein parsing the knowledge graph comprises:

extracting each entity from the plurality of entities represented by the plurality of nodes in the knowledge graph, wherein the identified metadata comprises the plurality of entities; and for each entity in a subset of the plurality of entities, determining a set of actions associated with the entity, wherein the identified metadata comprises the set of actions associated with the entity.

19. The system of claim 15, wherein generating the set of syntax rules comprises:

for each entity in the plurality of entities:
creating a token representing the entity,
for each property associated with the entity, creating a token representing the property,
for each action associated with the entity, creating a token representing the action, and
for each relationship associated with the entity, creating a token representing the relationship.

20. The system of claim 15, wherein the knowledge graph is for representing an ontology of data.

* * * * *